United States Patent
Nation et al.

(10) Patent No.: US 10,371,598 B1
(45) Date of Patent: Aug. 6, 2019

(54) HIGH SENSITIVITY BEARING TESTER AND SYSTEMS THEREOF

(71) Applicant: National Technology & Engineering Solutions of Sandia, LLC, Albuquerque, NM (US)

(72) Inventors: Brendan L. Nation, Albuquerque, NM (US); Michael T. Dugger, Tijeras, NM (US); Rand Garfield, Corrales, NM (US)

(73) Assignee: National Technology & Engineering Solutions of Sandis, LLC, Albuquerque, NM (US)

( * ) Notice: Subject to any disclaimer, the term of this patent is extended or adjusted under 35 U.S.C. 154(b) by 65 days.

(21) Appl. No.: 15/659,479

(22) Filed: Jul. 25, 2017

Related U.S. Application Data

(60) Provisional application No. 62/367,976, filed on Jul. 28, 2016.

(51) Int. Cl.
  *G01M 13/04* (2019.01)
  *G01L 5/00* (2006.01)
(52) U.S. Cl.
  CPC .......... *G01M 13/04* (2013.01); *G01L 5/0009* (2013.01)

(58) Field of Classification Search
  CPC .............................. G01M 13/04; G01L 5/0009
  See application file for complete search history.

(56) References Cited

U.S. PATENT DOCUMENTS

| | | | |
|---|---|---|---|
| 4,235,093 A | 11/1980 | Spall | |
| 4,672,838 A | 6/1987 | Reh | |
| 5,031,443 A | 7/1991 | Black et al. | |
| 5,559,294 A * | 9/1996 | Hoium | G01L 3/1478 73/862.18 |
| 6,003,229 A | 12/1999 | Beduhn et al. | |
| 6,009,764 A * | 1/2000 | Fukunaga | G01L 5/0009 384/448 |
| 6,886,392 B1 * | 5/2005 | Hall | G01N 33/30 73/10 |
| 2018/0136081 A1 * | 5/2018 | Lee | G01M 13/04 |

* cited by examiner

*Primary Examiner* — Jamel E Williams
(74) *Attorney, Agent, or Firm* — Helen S. Baca

(57) ABSTRACT

The present invention relates to an apparatus for testing a bearing, as well as systems including such an apparatus. In one instance, the apparatus allows for torsional losses of a bearing to be determined in a highly sensitive manner. Results can be determined in a controlled environment, as the system can include an environmental enclosure to encapsulate the testing apparatus.

20 Claims, 3 Drawing Sheets

HIGH SENSITIVITY BEARING TESTER AND SYSTEMS THEREOF

CROSS-REFERENCE TO RELATED APPLICATION

This application claims the benefit of U.S. Provisional Application No. 62/367,976, filed Jul. 28, 2016, which is hereby incorporated by reference in its entirety.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to an apparatus for testing a bearing, as well as systems including such an apparatus. In one instance, the apparatus allows for torsional losses of a bearing to be determined in a highly sensitive manner. Results can be determined in a controlled environment, as the system can include an environmental enclosure to encapsulate the testing apparatus.

BACKGROUND OF THE INVENTION

Sensitive measurements of mechanical components remain a challenge, especially as such components get smaller and environmental effects remain uncontrolled. In particular, ball bearings have numerous mechanical applications exposed to various types of thrust, loads, and inertial moment. The ability to accurately characterize such bearings can provide crucial design information. There is a need to for additional bearing testers capable of such measurements in a controlled manner.

SUMMARY OF THE INVENTION

Accordingly, the present invention relates to an apparatus for testing a bearing. In particular, the apparatus allows for coupled torsional losses to be measured in a highly sensitive manner. Torque measurements can be determined in a controlled environment, as the apparatus can be provided within an enclosure with controlled inlets and outlets to deliver one or more cover gases. The apparatus allows for rotation of an inner race of a test bearing by a reliable motor, in which a measurement of torsional loss includes use of a multiplier arm attached to an outer race of the test bearing. In turn, the arm is further coupled to a highly sensitive load cell configured to measure an exerted force. By measuring this exerted force and knowing the distance between the load cell and the center of the test bearing, torque can be calculated.

In one embodiment, the apparatus includes: a cartridge configured to couple directly or indirectly to an outer race of a bearing; an arm attached to the cartridge; a load cell includes a contact point attached to the arm; a motor shaft configured to couple directly or indirectly to an inner race of a bearing; and a motor configured to rotate the motor shaft. In some embodiments, the apparatus thereby allows the inner race to be rotated and permits torsional loss to be determined by measuring a force applied to the load cell by the arm. In one instance, the cartridge includes a first end and a second end, where the first end is configured to attach to the arm and where the second end is configured to attach to a mechanical balance.

The present invention also includes a system having any apparatus described herein. In one embodiment, the system includes an apparatus (e.g., any described herein) and an environmental enclosure disposed around the apparatus. In one instance, the enclosure further includes a gas inlet configured to deliver one or more fluids into the enclosure and a gas outlet configured to transmit the one or more fluids out of the enclosure. Additional details follow.

Definitions

As used herein, the term "about" means +/−10% of any recited value. As used herein, this term modifies any recited value, range of values, or endpoints of one or more ranges.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

The present invention relates to an apparatus for testing a bearing. In part, the apparatus relies on decoupling the rotational movement of the inner race from the outer race of a test bearing. For instance, as the inner race is rotated, the resultant torque of the outer race can be measured. By using such a configuration, coupled torsional loss can be determined.

Figure 1A:
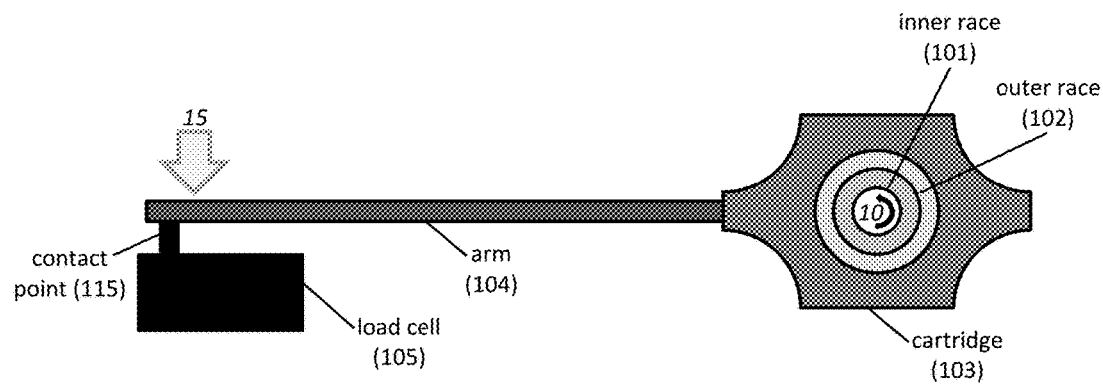
FIG. 1A-1C shows exemplary apparatuses. Provided are schematics of an exemplary apparatus including a cartridge 103 configured to couple directly or indirectly to an outer race 102 of a test bearing (FIG. 1A); and a motor shaft 107 configured to couple directly or indirectly to an inner race 101 of the test bearing (FIG. 1B). Also provided is a schematic of another exemplary apparatus including a non-limiting sleeve 1011 to indirectly couple the motor shaft 1007 to the inner race 1001 of the test bearing (FIG. 1C).

FIG. 1A provides an exemplary apparatus, in which an inner race 101 of a test bearing is rotated 10 (e.g., by a motor). Meanwhile, the outer race 102 of the test bearing is coupled to a cartridge 103, which in turn is attached to an arm 104. The force 15 exerted on the arm 104 can be measured in any useful manner, such as by employing a load cell 105. As the distance between the contact point 115 of the load cell 105 and the center of inner race 101 of the test bearing is known, torque can be calculated.

Figure 1B:
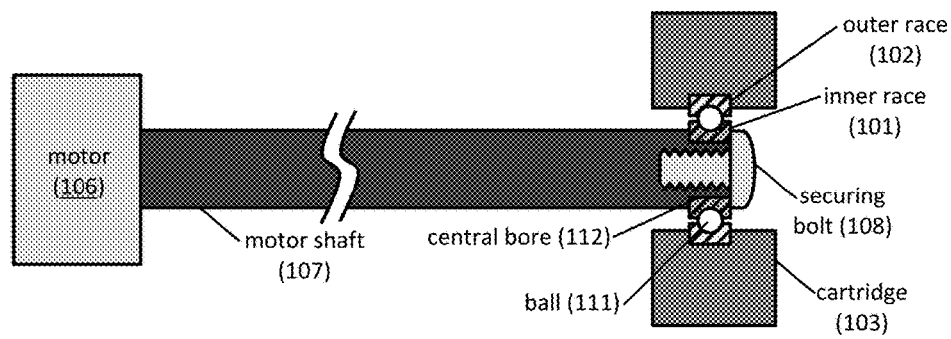

As seen in FIG. 1B, a test bearing can include any useful structural features, e.g., an inner race 101, an outer race 102, one or more balls 111 disposed between the two races, and a central bore 112 extending through the center of the test bearing. Any useful bearing can be tested. Exemplary, non-limiting bearings include one or more ball bearings, plain bearings, rolling element bearings, jewel bearings, fluid bearings, magnetic bearings, flexure bearings, composite bearings, needle roller bearings, tapered roller bearings, thrust bearings (e.g., ball thrust bearings and/or roller thrust bearings), spherical roller bearings, etc., which can optionally include any other useful structural feature, such as grooves, shafts, flanges, housing, lubricants, seals, mounts, rings, and/or washers.

As also seen in FIG. 1B, the apparatus is provided as a side view, in which the cartridge 103 is configured to couple to the outer race 102 of the test bearing. The inner race 101 of the test bearing is configured to couple to the motor shaft 107, which in turn is rotated by a motor 106. The inner race and the motor shaft can be coupled in any useful manner. In one instance, there is a direct coupling between the inner race and the motor shaft, in which an end portion of the motor shaft is configured to be slightly smaller than the central bore 112 of the test bearing. Thus, the end portion of the motor shaft can be directly inserted into the central bore 112, and a securing bolt 108 can be employed to affix the motor shaft 107 to the inner race 101.

In another instance, there is indirect coupling between the inner race and the motor shaft. For example, a sleeve can be configured to be disposed between an end portion of the motor shaft and a central bore of the test bearing. The sleeve can have any useful structure, including a flange to align the inner race of the test bearing, a shoulder to provide any desired distance between the bearing and the end of the motor shaft, and/or an inner hole configured to receive a securing bolt. In one instance, the motor shaft can further including a recessed portion on an end to align with the inner hole of the sleeve, thereby allowing a single securing bolt to attach the inner race to the sleeve and to the motor shaft.

Figure 1C:
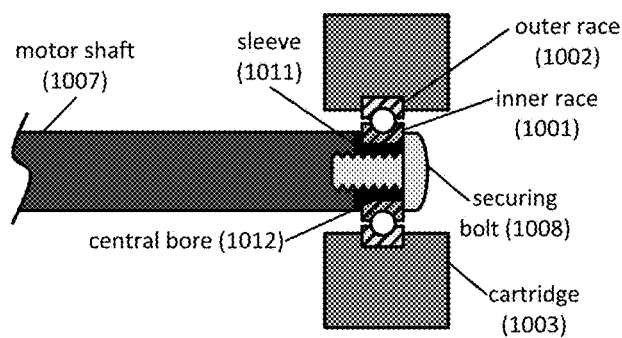

As seen in FIG. 1C, in one embodiment, a sleeve 1011 is configured to couple with the end portion of the motor shaft 1007, where the sleeve further interacts with a central bore 1012 disposed within the inner race 1001, thereby coupling the end portion of the motor shaft with the inner race. Furthermore, a securing bolt 1008 can be configured to attach the inner race 1001 to the sleeve 1011, as well as to the end of the motor shaft 1007. The cartridge 1003 can have any useful construction that allows for coupling to the outer race 1002 of the test bearing.

Figure 2A:
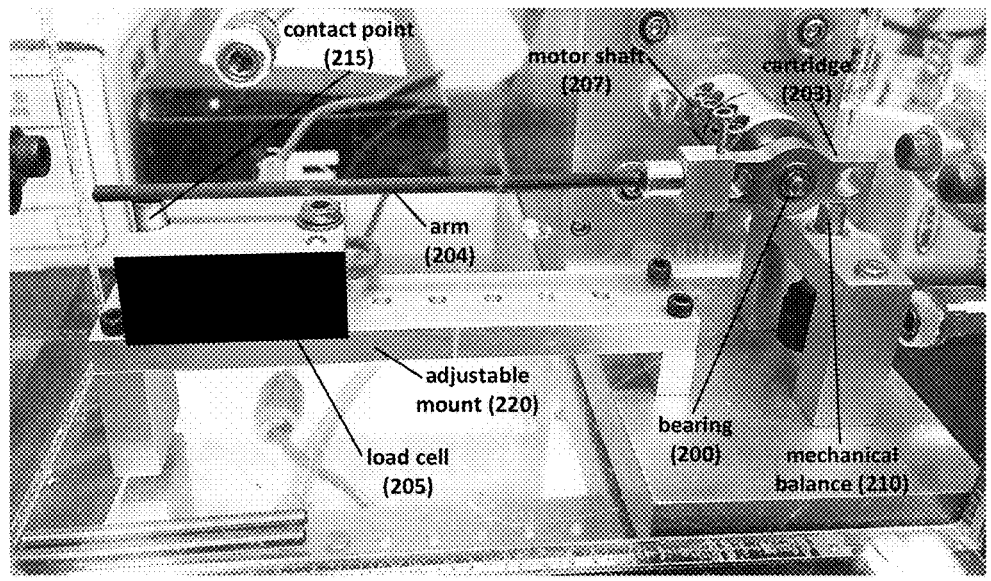
FIG. 2A-2C shows photographs of an exemplary system. Provided are photographs of a front view of the system having an arm 204 attached to a cartridge 203 on one end and a load cell 205 on the other end (FIG. 2A), a close-up view of the test bearing 200 and the cartridge 203 (FIG. 2B), and a top view of the system showing the enclosure 230 (FIG. 2C).
Figure 2B:
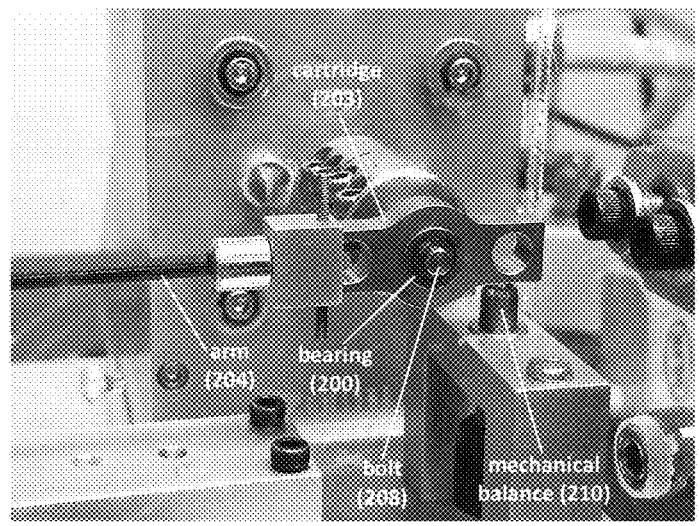
Figure 2C:
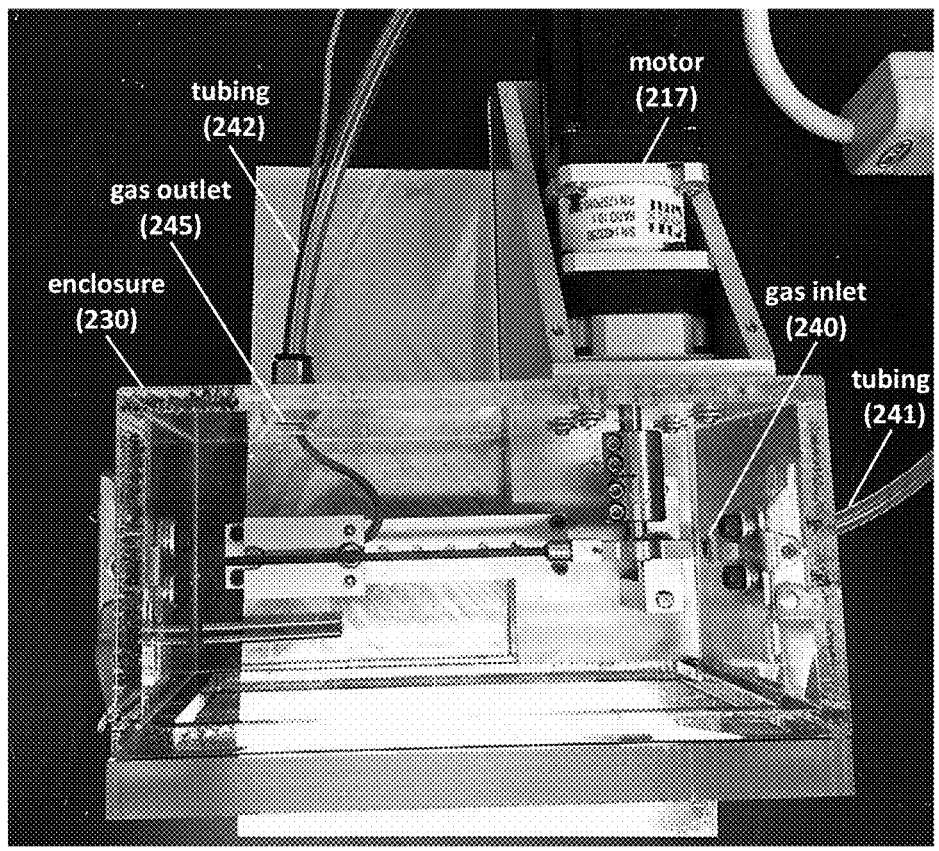

The apparatus can be provided within an enclosure, thereby providing a system. FIG. 2A-2C shows an exemplary system. FIG. 2A shows a photograph of a front view of the system, which includes a load cell 205 disposed upon an adjustable mount 220. In some instances, the location of the load cell may be adjusted along any positioning hole located on the mount. The system also includes a multiplier arm 204, which is attached at one end to the contact point 215 of the load cell 205. The other end of the arm 204 is attached to the cartridge 203, which houses the test bearing 200 (e.g., by way of attaching to the outer race of the test bearing). The cartridge 203 is then attached to the motor shaft 207, which in turn is attached to a motor.

FIG. 2B provides a close-up view of the cartridge 203, which couples to the outer race of the test bearing 200. A bolt 208 couples the inner race of the test bearing 200 to a motor shaft. Optionally, the cartridge 203 can have two opposing ends, in which a first opposing end is coupled to an arm 204 and the second opposing end is coupled to a mechanical balance 210.

FIG. 2C provides a top view of the system, which includes the apparatus that is housed within an enclosure 230. As can be seen, the motor 217 can be optionally disposed outside of the enclosure 230. The environmental condition can be controlled and/or changed by way of injecting one or more fluids (e.g., gases, such as cover gases having controlled humidity and controlled composition, such as oxygen, nitrogen, argon, etc.) into an gas inlet 240 and evacuating the fluid(s) out of the gas outlet 245. One or more tubing 241,242 can be employed to deliver such fluid(s).

Example

A bearing tester was developed with high sensitivity for small diameter bearings. The bearing tester also has the capability to work in a protected environment, thereby shielding the bearing and/or lubricants from detrimental environmental effects.

Current torque load cells do not have the resolution to measure small forces accurately, especially those arising from small test bearings. One non-limiting technical purpose is to measure the coupled torsional losses resulting from the rotation of the inner race of a small diameter bearing. This is determined by measuring the torque that is coupled to the outer race of the bearing, multiplying it by attaching a long arm to an exterior portion of the bearing, and then measuring the miniscule force with a load cell. By moving the load cell a significant distance from the test bearing, one can resolve much smaller forces resulting from torsional losses in the bearing.

Further, current industrial capabilities do not attempt to shield the bearing from the ambient environment. The apparatus herein can be employed within an airtight environmental chamber, which can provide the ability to shield the bearing and the apparatus with a cover gas during operation. This can be useful when testing bearings that have been treated with oxygen-sensitive and/or moisture-sensitive lubricants.

Sensitivity is improved by use of a high quality, low capacity load cell that is used in conjunction with an aligned, low loss carbon fiber multiplier arm. The servo motor that rotates the inner race of the bearing is designed to operate smoothly and repeatably. The motor is geared 10:1 to operate in an ideal rpm range for maximizing performance.

A custom software suite was designed to allow the user to capture a multi-part bearing test including modular sequences, e.g., oscillating between small angles, such as by moving back and forth in one area of the bearing; a low speed torque test, such as by revolving the bearing slowly while torque is measured at a high rate; and/or a high speed wear-in sequence test, such as by spinning the bearing at a high rate of speed. Finally, the data are output in any useful format (e.g., an ASCII format), which shows the measured torque and the angular location of the data point.

Table 1 provides an exemplary set of parameters for an apparatus or system, such as any described herein.

TABLE 1

| Properties | Measurement |
| --- | --- |
| Load Cell Non-Linearity | 0.05% |
| Load Cell Hysteresis | 0.05% |
| Load Cell Non-Repeatability | 0.05% |
| Load Cell Combined Error | 0.15% |
| Load Cell Capacity | 0.0981 N |
| Load Cell Voltage Output | 10 V |
| Load Cell Calibration Factor | 0.00981 N/V |
| Torque Arm Length | 0.10541 m |
| DAQ Absolute Accuracy at Full Scale | 1.52 mV |

TABLE 1-continued

| Properties | Measurement |
| --- | --- |
| DAQ Noise | 0.281 mV |
| Lowest Possible Accurate Reading | 1.801 mV |
| Safety Margin on Reading | 2.5 |
| Lowest Possible Safe Margin Voltage | 4.5025 mV |
| Lowest Possible Safe Margin Force | 4.41695E−05 N |
| Lowest Possible Safe Margin Torque | 4.65591E−06 N · m |
| Lowest Possible Safe Margin Torque | 0.465590963 mN· cm |

OTHER EMBODIMENTS

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. An apparatus for testing a bearing, the apparatus comprising:
    a cartridge configured to couple directly or indirectly to an outer race of a bearing, wherein the cartridge is configured to couple the outer race but not to the inner race, wherein the cartridge comprises a first end and a second end, wherein the first end is configured to attach to the arm, and wherein the second end is configured to attach to a mechanical balance;
    an arm attached to the cartridge;
    a load cell comprising a contact point attached to the arm;
    a motor shaft configured to couple directly or indirectly to an inner race of a bearing; and
    a motor configured to rotate the motor shaft, thereby allowing the inner race to be rotated and permitting the torsional loss to be determined by measuring a force applied to the load cell by the arm.

2. The apparatus of claim 1, further comprising:
    a securing bolt configured to attach the inner race to an end portion of the motor shaft.

3. The apparatus of claim 1, further comprising:
    an adjustable mount configured to allow a location of the load cell to be adjusted along the arm.

4. The apparatus of claim 1, wherein the arm comprises a carbon fiber material.

5. The apparatus of claim 1, wherein the motor shaft is configured to couple indirectly to the inner race.

6. The apparatus of claim 5, further comprising:
    a sleeve configured to couple with an end portion of the motor shaft, wherein the sleeve interacts with a central bore disposed within the inner race, thereby coupling the end portion of the motor shaft with the inner race.

7. The apparatus of claim 6, further comprising:
    a securing bolt configured to attach the inner race to the sleeve.

8. A system comprising:
    an apparatus of claim 1; and
    an environmental enclosure disposed around the apparatus.

9. The system of claim 8, wherein the enclosure further comprises a gas inlet configured to deliver one or more fluids into the enclosure and a gas outlet configured to transmit the one or more fluids out of the enclosure.

10. The system of claim 9, wherein the motor is disposed outside of the enclosure.

11. The system of claim 8, further comprising:
    a processor configured to control a rate of speed of the motor, to measure a force of the load cell, and/or to calculate a torque based on the force.

12. An apparatus for testing a bearing, the apparatus comprising:
    a cartridge configured to couple directly or indirectly to an outer race of a bearing;
    an arm attached to the cartridge;
    a load cell comprising a contact point attached to the arm, wherein a distance between the contact point and a center of the bearing is of from about 5 cm to about 20 cm;
    a motor shaft configured to couple directly or indirectly to an inner race of a bearing; and
    a motor configured to rotate the motor shaft, thereby allowing the inner race to be rotated and permitting the torsional loss to be determined by measuring a force applied to the load cell by the arm.

13. The apparatus of claim 12, wherein the load cell comprises of from about 5 g to about 25 g.

14. A system comprising:
    an apparatus of claim 12;
    an environmental enclosure disposed around the apparatus; and
    a processor configured to control a rate of speed of the motor, to measure a force of the load cell, and/or to calculate a torque based on the force.

15. The apparatus of claim 12, further comprising:
    an adjustable mount configured to allow a location of the load cell to be adjusted along the arm.

16. The apparatus of claim 12, wherein the arm comprises a carbon fiber material.

17. The apparatus of claim 12, wherein the motor comprises a servo motor.

18. An apparatus for testing a bearing, the apparatus comprising:
    a cartridge configured to couple directly or indirectly to an outer race of a bearing;
    an arm attached to the cartridge;
    a load cell comprising a contact point attached to the arm;
    a motor shaft configured to couple directly or indirectly to an inner race of a bearing; and
    a motor configured to rotate the motor shaft, thereby allowing the inner race to be rotated and permitting the torsional loss to be determined by measuring a force applied to the load cell by the arm, wherein the motor comprises a servo motor.

19. The apparatus of claim 18, wherein the servo motor is geared at a ratio of from about 5:1 to about 20:1.

20. A system comprising:
    an apparatus of claim 18;
    an environmental enclosure disposed around the apparatus; and
    a processor configured to control a rate of speed of the motor, to measure a force of the load cell, and/or to calculate a torque based on the force.

* * * * *